Aug. 17, 1965   R. R. THOMPSON   3,200,431
WINDSHIELD WIPER BLADE
Filed April 1, 1963
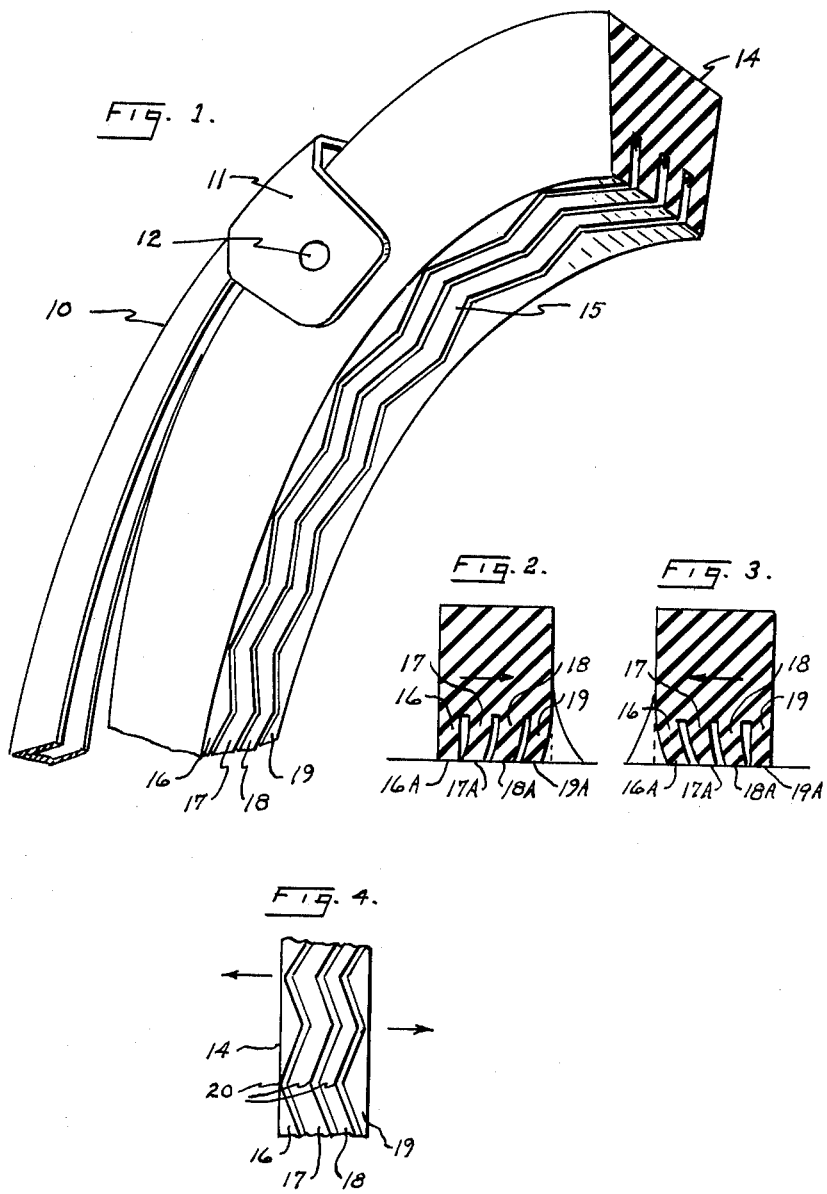
INVENTOR
RICHARD R. THOMPSON
BY
Howard T. Jeandron
AGENT

United States Patent Office 3,200,431
Patented Aug. 17, 1965

3,200,431
WINDSHIELD WIPER BLADE
Richard R. Thompson, Totowa, N.J., assignor to The Jack P. Hennessy Sales Co., Inc., Chicago, Ill., a corporation of Illinois
Filed Apr. 1, 1963, Ser. No. 269,256
1 Claim. (Cl. 15—250.41)

This invention relates to a wiping element for a windshield and more particularly to the wiper blade and the formation of its contacting surfaces.

It has become practically universal to provide a wiper for the windshield of an automobile. However in practically every windshield wiper in use today there is a single flexible edged blade provided. The windshield wiper blade as a means of wiping away rain as a fluid is a simple matter and the blade performs efficiently. However when the rain becomes snow, the single edge flexible blade reaches a point where the forces clearing the windshield are too great for the blade and the blade simply rides over the snow formation and no longer performs its designated function. The single edge flexible blade utilized today is in the same category as the narrow automobile tires that were originally designed for automobiles. The narrow tread of these tires was found to be entirely inadequate for propulsion of an automobile in snow. Thus the original narrow tire has developed to the present day broad tread tire and the tread itself has developed into a pattern that provides a gripping relation with the snow thus providing adequate propulsion for the automobile.

Advancing this theory to the wiper blade of this invention, it is an object of this invention to provide a broader contacting surface for a wiper blade and there is further provided a tread or pattern design for the contacting surface to insure a definite gripping of the snow that may adhere to a windshield to permit wiping it from the surface of the windshield.

A further object of this invention is to provide a single contiguous windshield wiper blade that is provided with a plurality of windshield contacting surfaces.

A still further object of this invention is to provide a single contiguous windshield wiper blade that is provided with a plurality of windshield contacting surfaces and in which a pattern or formation of the contacting surfaces is provided so that the contacting surfaces present a broader wiping area.

A still further object of this invention is to provide a single contiguous windshield wiper blade that is provided with a plurality of windshield contacting surfaces and in which there is a pattern or formation of the contacting surfaces to provide a plurality of points of contact with the snow to be wiped which resolve into a plowing effect.

Other objects and advantages of this invention will be apparent from the following detailed description when taken in conjunction with the accompanying drawings in which FIG. 1 is a perspective illustration of a portion of a windshield wiper element and the wiping blade, FIG. 2 is a cross sectional view of the wiper blade while moving in one direction, FIG. 3 is a cross sectional view of the wiper blade while moving in the opposite direction, and FIG. 4 is a plan view of the contacting surface of the wiper blade.

Referring to the drawings wherein like reference numerals designating similar parts throughout the various views, there is provided in FIG. 1 a windshield operating arm 10 with its connecting link 11 and affixed to the link 11 by a pin 12 is a wiper blade 14. The wiper blade may be curved as illustrated where it is to be applied to a curved windshield. However the blade 14 may be perfectly straight where it is to be applied to a normally straight windshield. The blade 14 is provided as a single element of a flexible material such as rubber. It is to be noted that the blade 14 has all of the characteristics of a normal windshield wiper blade, that is, it is flexible and will provide the same wiping action as normally found with a single edge blade. However it is to be noted that the contacting surface 15 of blade 14 has been cut or formed into a plurality of independent portions 16, 17, 18 and 19 with contacting surfaces 16A, 17A, 18A and 19A (FIGS. 2 and 3). It is to be further noted that the manner in which the contacting surfaces 16A-19A have been separated is in a pattern similar to the patterns developed for a snow tread for automotive tires rather than as a single straight peripheral cut or formation. Referring to FIGS. 2 and 3 it is apparent that the plurality of contacting surfaces will have a desired effect as the windshield wiper advances in either direction over the surface of the windshield. In FIG. 2 when the wiper blade is moving to the right the advancing portion 19 will receive the maximum wiping load as a progression of snow piles up with the movement of the blade. The effect is to deform or bend portion 19 inward and portion 18 reinforces the movement of portion 19 taking up the wiping load so that surface 18A begins to assume the wiping until the load further increases when both portions 19 and 18 are distorted and portion 17 reinforces portion 18 and the contacting surface 17A begins to pick up the wiping action and in turn with the increase of load the distortion of portion 17 if any will be taken up by portion 16 to thus insure a final wiping by surface 16A as the blade completes its final cycle of movement in one direction. Likewise the whole process is reversed as the blade reverses its direction of movement as shown in FIG. 3, portion 16 becoming the leading face and 16A the leading contact. And in similar fashion as the load is increased during its cycle of movement each of the portions will assist in reinforcing the distortion of the other portions until the blade has completed its cycle of movement in that direction. It is also to be noted that in this cycle of movement back and forth where a normal single edge blade will overload and ride over the snow adhering to the windshield in this instance there are a plurality of contacting surfaces so that if the first surface, FIG. 2, 19A rides over the snow adhering to the windshield surface, 18A immediately takes up the wiping effect to dig in and clear the windshield and if that in turn begins to override the snow adhering, the next surface 17A will in turn dig in and clear the windshield until it may override and the final surface 16A will dig in and clean the windshield to finish the cycle of movement in that direction. Thus in this invention the plurality of surfaces insure a positive wiping of the surface during each cycle of operation.

Referring to FIG. 4 there is shown a particular pattern for the contacting surface of the wiper blade 14. However this particular pattern may be varied just as the patterns of snow tires have been greatly varied to produce the same effect of gripping the snow they are to contact. In this embodiment the pattern illustrated in FIG. 4 provides a plurality of flexible portions 16–19. However to assist these portions in their function of pushing the snow that adheres to the windshield in fact pushing the snow that piles up against the blade as it moves across the windshield, it is to be noted that the pattern provides an angular formation of the portions 16–19 so that when the blade 14 is moved to the left there are a pluraltiy of plow shaped blades 16–19 having an apex 20. This produces a sharp impact at the point or apex dividing the snow load so that it is pushed to either side of the apex 20 and thus breaking the skin friction or retaining freeze grip with the surface of the windshield. As soon as this skin friction or grip is broken by the impact of the apex, the further movement of the snow is not as difficult as the snow then tends to slide easily with the movement of the blade. Thus although a great deal of snow may pile up, it's the ability of the blade through its plurality of apexes to produce a definite break away of the snow or ice that may have formed on the surface of the windshield. It is to be noted that the wiper blade 14 has ben shown wider than a normal wiper blade. The desirable width may be varied, that is, for rain, a single edge may be sufficient but unfortunately with rain there is a definite build up of dirt esepecially the dirt thrown up from the road by other cars to thus spatter the windshield with a coating of dirt. The effect of the dirt with the rain produces a great deal more friction and the dual edges of blade 14 provides a far better wiping effect than produced by a single edge blade. It is to be further noted that where the wiper blade is to be used in an area where there is little snow, the width of blade 14 may be at a minimum and still retain the plurality of edges as illustrated. However where the wiper blade is to be used in an area where there is a great deal of snow, the blade may be designed to a maximum width that is plausible for this type of operation thus providing a blade with the desired strength to insure a definite wiping operation under the snow load.

Although the wiper blade has been shown with a particular snow tread design this pattern or design may be varied as the snow tire treads have been varied to produce the same effect without departing from the spirit of this invention and although the blade has been cut or formed to a certain depth to provide a plurality of separated contact portions, the depth of the cut or formation may be varied to vary the flexibility of the reinforcing or pick up effect without departing from the spirit of this invention and although the blade has been described as comprised of a rubber or flexible material, the blade may be composed of two or more materials that is a stiffer material in the body of the blade and a fairly flexible material in the peripheral portions as long as it is formed into a contiguous form as shown without departing from the spirit of this invention and this invention shall be limited only by the appended claim.

What is claimed is:

An attached windshiped wiper for a vehicle comprising
  a wiper operating arm and a wiper blade mounted in juxta-position to the exterior surface of the wind-windshield for wiping, rain, snow and ice from the windshield,
  said wiper blade being a pre-curved resilient continguous element,
  said wiper blade formed as a broad body portion to be retained by said wiper operating arm parallel to the windshield and with a face having a plurality of parallel contacting surfaces having a serpentine formation that remain in contact with said exterior surface of the windshield,
  said contacting surface separated from each other to be independently flexed.

References Cited by the Examiner
UNITED STATES PATENTS

| | | | |
|---|---|---|---|
| 1,915,775 | 6/33 | Christen | 15—250.4 X |
| 2,011,015 | 8/35 | Schleicher | 15—250.4 |
| 2,689,369 | 9/54 | Biek | 15—245 |
| 2,949,651 | 8/60 | Hill | 15—250.41 X |
| 3,116,506 | 1/64 | Browne et al. | 15—250.36 |

FOREIGN PATENTS

| | | |
|---|---|---|
| 820,156 | 7/37 | France. |

CHARLES A. WILLMUTH, *Primary Examiner.*